United States Patent
Zhang et al.

(10) Patent No.: US 8,699,492 B2
(45) Date of Patent: *Apr. 15, 2014

(54) METHOD AND APPARATUS FOR SIMULATING IP MULTINETTING

(75) Inventors: Debin Zhang, Littleton, MA (US); Roger Lapuh, Uesslingen (CH); Ganesh Nakhawa, Westford, MA (US)

(73) Assignee: Rockstar Consortium US LP, Plano, TX (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/286,241

(22) Filed: Nov. 1, 2011

(65) Prior Publication Data

US 2012/0044937 A1  Feb. 23, 2012

Related U.S. Application Data

(63) Continuation of application No. 12/490,180, filed on Jun. 23, 2009, now Pat. No. 8,064,458.

(51) Int. Cl.
*H04L 12/28* (2006.01)

(52) U.S. Cl.
USPC .......................... 370/392; 370/401; 370/389

(58) Field of Classification Search
USPC .......................... 370/392, 401, 389, 352, 252
See application file for complete search history.

(56) References Cited

U.S. PATENT DOCUMENTS

| | | | | |
|---|---|---|---|---|
| 6,061,334 | A * | 5/2000 | Berlovitch et al. | 370/255 |
| 8,064,458 | B2 * | 11/2011 | Zhang et al. | 370/392 |
| 2007/0274321 | A1 | 11/2007 | Jonsson et al. | |

* cited by examiner

*Primary Examiner* — Duc C Ho

(74) *Attorney, Agent, or Firm* — Anderson Gorecki & Rouille LLP

(57) ABSTRACT

IP Multinetting on a local area network is simulated by performing VLAN translation at a port connecting to the local area network. This allows IP addresses from multiple subnets to be associated with a single VLAN on the Local Area Network (LAN), while allowing the core switch to process the packets with a one-to-one correspondence between IP Subnet and VLAN. When a packet is received from the local area network at an IP multinetting port, the VLAN ID will be read to determine if the packet contains the IP Multinetting VLAN ID. The IP Subnet address will also be checked to see if the packet is associated with an IP Subnet that is part of the Multinetting. If so, the multinetting VLAN ID will be changed to an IP Subnet specific VLAN ID before the packet is processed by the core switch.

10 Claims, 5 Drawing Sheets

METHOD AND APPARATUS FOR SIMULATING IP MULTINETTING

CROSS REFERENCE TO RELATED APPLICATIONS

This application is a continuation of U.S. patent application Ser. No. 12/490,180, filed Jun. 23, 2009 now U.S. Pat. No. 8,064,458, the content of which is hereby incorporated herein by reference.

TECHNICAL FIELD

The present invention relates to communication networks and, more particularly, to a method and apparatus for simulating IP multinetting.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Multiple Virtual Local Area Networks (VLANs) may be implemented on a given set of interconnected network elements to enable sub-groups of users to communicate with each other. For example, an enterprise network may have an Ethernet local area network (LAN) deployed to enable data and optionally voice communication to occur within the enterprise. One or more VLANs may be run on top of the this Ethernet network to enable different groups to communicate with each other on the network. As a simple example, the enterprise may have an untrusted VLAN that users are allowed to connect to prior to authentication, and a trusted VLAN that the users are allowed to connect to after authentication processes have been completed. In this way both secure and unsecured communications can occur on the same Ethernet network.

Implementation of VLANS on an Ethernet network is enabled by IEEE 802.1Q, which enables a Q-tag containing a VLAN ID to be added to the Ethernet frame header. By tagging traffic with the appropriate VLAN ID, the traffic may be separated into multiple VLANS on the same underlying Ethernet network.

When a computer or other device connects to a communication network, it will undergo authentication/authorization processes to determine the type of privileges it should be granted on the network. In addition, an Internet Protocol address will be assigned to the computer/other device. The Internet Protocol address enables other devices on the network to route traffic to the computer/device.

Some Ethernet switches are constructed such that there is a built-in assumption that each VLAN on the Ethernet network will be associated with at most one class C IP address subnet, e.g. 192.168.10.1/24. This limits the number of computers per VLAN to the number of addresses within the subnet. In a typical IP subnet, with approximately 250 IP addresses, the number of users that may connect to the VLAN is thus limited to approximately 250.

As the number of computers/devices supported by a given Ethernet switch increases, it may be desirable to have more than one subnet associated with a given VLAN. The process of associating IP addresses from multiple IP subnets with the same VLAN will be referred to herein as "IP Multinetting". For example, a large office building may have 500 or more people working on the same floor, supported by a given Ethernet switch, who would all like to be part of the same VLAN. Since a given IP subnet is limited to approximately 250 IP addresses, the workers will need to be assigned IP addresses from more than one IP subnet. Hence, if these workers are all to be part of the same VLAN, the Ethernet switch will need to be able to associate IP addresses from more than one IP subnet with a given VLAN.

Although some Ethernet switches have been built to support IP Multinetting, unfortunately, as noted above, some Ethernet switches are not built to support this feature. Indeed, the one-to-one association between IP subnet and VLAN may pervade the underlying operating code within the control plane and even be hard coded into the data plane (fastpath) of the Ethernet switch. Thus, in a switch of this nature, from a layer 3 perspective, only IP addresses from one IP subnet will be populated into the routing tables (Forwarding DataBase or FDB) for a particular VLAN ID. Stated differently, the Forwarding Database (FDB) for the VLAN will only contain IP addresses from a particular IP subnet. Thus, only packets addressed to IP addresses within the particular IP subnet will be able to be transmitted over the VLAN on the Ethernet network.

Although it may be possible to redesign the operating code and fastpath at great cost, a more optimal solution would be to find a way to overcome this limitation so that the Ethernet switch could support IP multinetting without modifying the underlying infrastructure.

SUMMARY OF THE INVENTION

IP Multinetting on a local area network is simulated by performing VLAN translation at a port connecting to the local area network. This allows IP addresses from multiple subnets to be associated with a single VLAN on the Local Area Network (LAN), while allowing the core switch to process the packets with a one-to-one correspondence between IP Subnet and VLAN. In one embodiment, when a packet is received at the port from the local area network, if the port is configured to implement IP multinetting, the port will read the VLAN ID of the packet to determine if the packet contains an IP Multinetting VLAN ID. If so, the port will determine whether the packet is addressed from a host with an IP address associated with the IP Multinetting VLAN. The IP subnet will then be used to determine a corresponding VLAN having a one-to-one correspondence with the IP subnet. The port will perform VLAN translation to change the IP Multinetting VLAN to the IP subnet specific VLAN before forwarding the packet for processing by the network element. The same process may be performed in reverse to translate IP subnet specific VLANs into a shared VLAN ID to enable IP Multinetting to be simulated by network elements that don't natively support IP multinetting.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Enterprise consolidation and security considerations are drivers that demand that networks be virtualized. Virtualization of a network enables a virtual network to be created over the physical network so that traffic may be maintained private to the subset of users and nodes that form part of the virtual network. Layer 2 (i.e. Ethernet) Virtual Local Area Networks (VLANs) are one way that networks may be virtualized to enable subsets of users to communicate with each other on the network.

Figure 1:
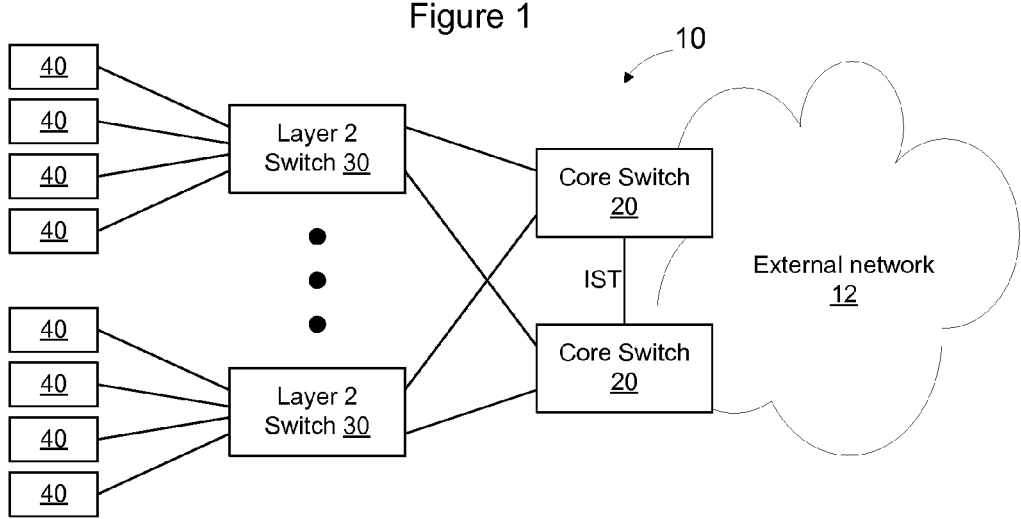
FIG. 1 is a functional block diagram of a reference network.

FIG. 1 shows an example reference network 10 in which client systems 40 connect to one or more Layer 2 Switches 30, which in turn are connected to corer switches 20. The core switches 20 provide connectivity between the local area network 10 and an external network 12. The Layer 2 switches 30 will generally be dual-homed to a pair of core switches so that, if one of the core switches should fail, the other core switch can assume responsibility for forwarding traffic between the local area network and external network. For example, in FIG. 1, multiple layer 2 switches 30 are each dual homed to a pair of core switches 20. The core switches may be interconnected by an inter-switch trunk (IST) to enable the core switches to exchange information with each other and to route traffic between each other. Other network configurations are possible as well and the invention is not intended to be limited to application in a network architecture as shown in FIG. 1.

Figure 2:
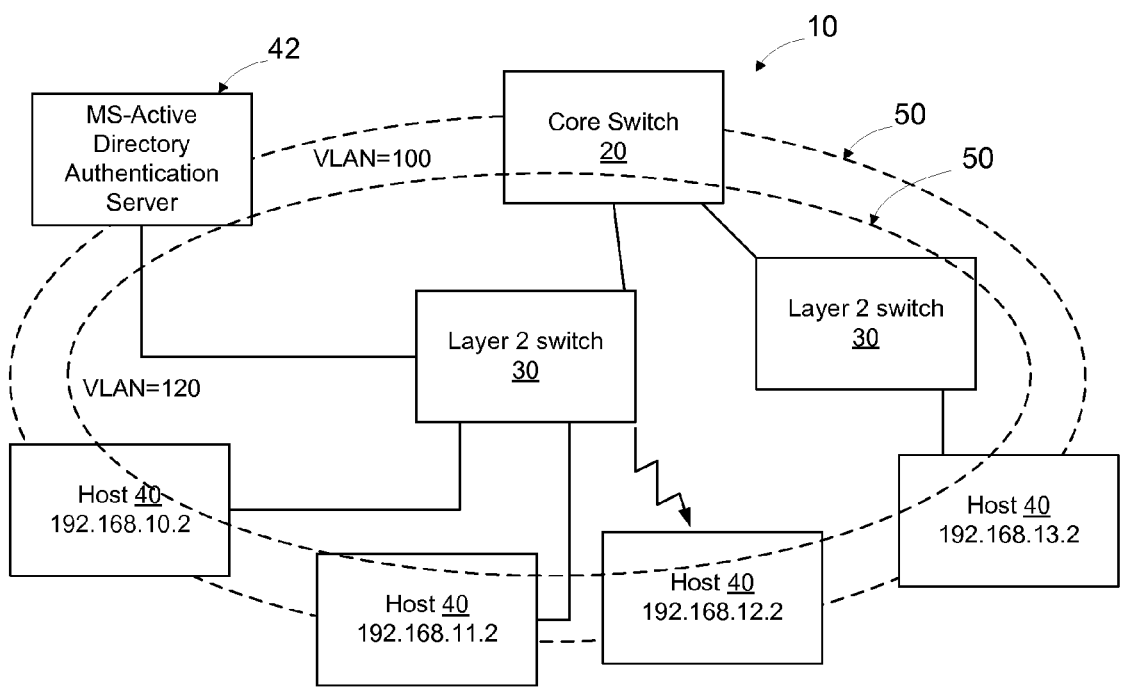
FIG. 2 is a functional block diagram of the reference network of FIG. 1 in greater detail showing several example VLANs on the network.

FIG. 2 shows another view of the example Ethernet network 10 including one or more core switches 20 and a plurality of layer 2 Ethernet switches 30. The core switch 20 provides a gateway function to interconnect the Ethernet network 10 to a service provider's network. The core switch typically will include both layer 2 and layer 3 functionality to enable the core switch to route traffic directed out of the Ethernet network onto the service provider's network (egress traffic) and to route traffic directed into the Ethernet network from outside of the Ethernet network (ingress traffic).

The layer 2 switches provide layer 2 connectivity to client systems 40 on the network. The client systems 40 (also referred to as hosts) are end devices on the Ethernet network 10. Example hosts include servers, personal computers, laptop computers, personal data assistants, IP phones, and other devices that commonly connect to an Ethernet network either to provide services on the network or to obtain services over the network. For example, one or more hosts may provide authentication services on the Ethernet network, such as an MS-Active Directory Authentication Server 42. The layer 2 switches may provide wired connectivity to the hosts, or may provide wireless connectivity to the hosts.

Within the Ethernet network, traffic is tagged with particular VLAN ID to enable the traffic to be handled in particular way by the Ethernet switches and hosts. Ethernet traffic may be tagged as set forth in IEEE standard 802.1Q or 802.1ad. The VLAN tag specified in 802.1Q enables a Customer VLAN ID (C-VID) to be added to a standard Ethernet header. 802.1ad enables a second Q-tag to be added, and is commonly used by providers to add a provider-based tag to the customer Ethernet header. 802.1ad is also referred to as Provider Bridging or Q-in-Q, since it enables a S-VID to be added to the frame for creation of VLANs within the provider network. Other ways of tagging traffic may be used as well.

There are many ways to configure the network to implement VLANs on the network. For example, one VLAN ID may be associated with untrusted traffic and another VLAN ID may be associated with trusted traffic. For example, FIG. 2 shows two VLANs 50 (VLAN 100 and VLAN 120) implemented on the Ethernet network 10. VLAN 100 may be, for example, an untrusted VLAN such that anyone is allowed to connect to and communicate over VLAN 100. Thus, when a host 40 connects to the Ethernet network for the first time, the host will be assigned to VLAN 100 until the host has authenticated with the Authentication Server 42. After the host has authenticated with the authentication server 42, the host will be re-assigned to the trusted VLAN 120. Traffic within trusted VLAN 120 is tagged using a different VLAN ID and is not visible to hosts on VLAN 100.

Use of different VLANs on the Ethernet network 10 enables different services to be provided to hosts on the network. For example, the Ethernet network may include one or more secure servers, access to which is only to be provided to authenticated hosts. By using different VLANs, the server may selectively enable hosts associated with the secure VLAN to have access to particular resources while preventing all other hosts from having access to the protected resources.

The local area network in FIG. 2 is an Ethernet network, in which the layer 2 switches forward traffic based on the MAC addresses (and VLAN ID) associated with the MAC header. Traffic outside of the local area network, however, is a routed network such as an Internet Protocol network.

There are situations where it is desirable to have all users of the local area network, or a large number of users of the local area network, operate within the local area network on a single VLAN. However, some core switches have a built-in assumption that each VLAN will only contain IP addresses from a given class C IP subnet. This underlying assumption is used by the core switch to disambiguate traffic to and from the local area network. For example, when the core switch receives a packet from the external routed network (ingress direction), the core switch will read the IP subnet address and use the IP subnet address to determine the L2 VLAN on the Ethernet network. The core switch will also use the IP subnet address to determine the output port over which the packet should be forwarded. The packet will then be tagged with the VLAN ID and forwarded over the port onto the Ethernet network. Likewise in the egress direction, the VLAN ID will be used by the core switch to determine an IP address to be added to the packet before the packet is forwarded onto the external routed network.

Unfortunately, if the core switch has an in-grained assumption that there is a one-to-one correspondence between IP subnet and VLAN, that means that the VLAN is limited to at most about 250 hosts (assuming a class C IP subnet). While this is sufficient for some types of networks, it provides a restriction that is deemed to be unacceptable to large enterprises, which may want a single L2 switch to support in excess of 500 users on the same VLAN. Accordingly, in these situations, the core switch should be able to associate multiple IP subnets with the same VLAN. However, it would be very costly to redesign the underlying software and hardware running on the core switch so that the core switch would not assume a one-to-one correspondence between IP subnet and VLAN.

Thus, according to an embodiment of the invention, VLAN translation is implemented at one or more Local Area Network (LAN) ports of a network element so that traffic on the LAN is able to be tagged using the same VLAN ID regardless of the IP subnet associated with the host IP address on the LAN. However, within the network element, the traffic is tagged using IP subnet specific VLAN tags, so that at most one subnet is associated with a particular VLAN while the network element is processing the traffic. Accordingly, a network element that is designed to process traffic assuming a one-to-one correspondence between IP subnet and VLAN is able to do so and the underlying architecture of the network element is not required to be modified to enable the network element to support IP multinetting. Thus, the core switch is able to support IP multinetting on the local area network, without requiring the core switch to be redesigned to truly enable multiple IP subnet addresses to be assigned to the same VLAN.

Figure 3:
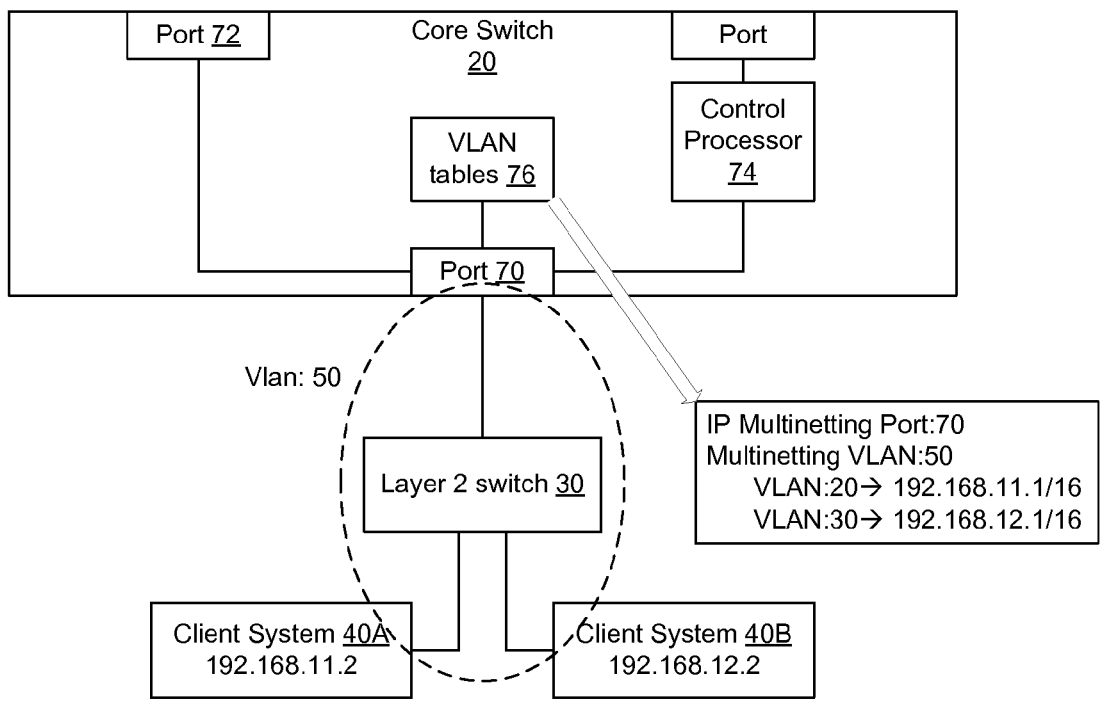
FIG. 3 is a functional block diagram of a core switch configured to implement IP multinetting according to an embodiment of the invention.

FIG. 3 shows an example core switch according to an embodiment of the invention. As shown in FIG. 3, the core switch 20 includes multiple LAN ports 70, each of which connects to one or more layer 2 switch. The core switch 20 also includes multiple ports 72 which connect to the external routed network. A control processor 74 running one or more control processes, such as routing processes, is used to control operation of the core switch 20. The control processor can engage in protocol exchanges with network devices over the external routed network as well as over the local area network.

Figure 4:
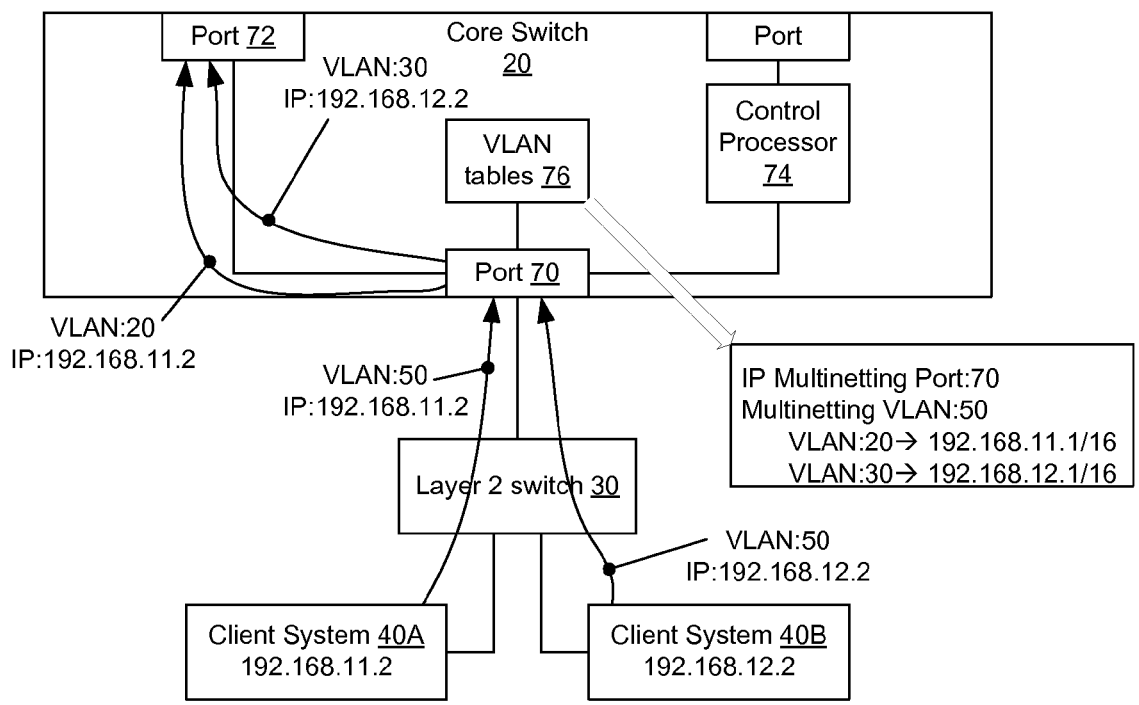
FIG. 4 is a functional block diagram of the core switch of FIG. 3 showing translation of VLAN ID at a LAN port according to an embodiment of the invention.

FIG. 4 shows the example core switch of FIG. 3 and illustrates how the core switch performs VLAN translation to simulate IP multinetting on the VLAN while enabling the core switch to process packets with the assumption that there is only one IP subnet per VLAN. This process is described in greater detail below in connection with FIGS. 5 and 6.

Figure 5:
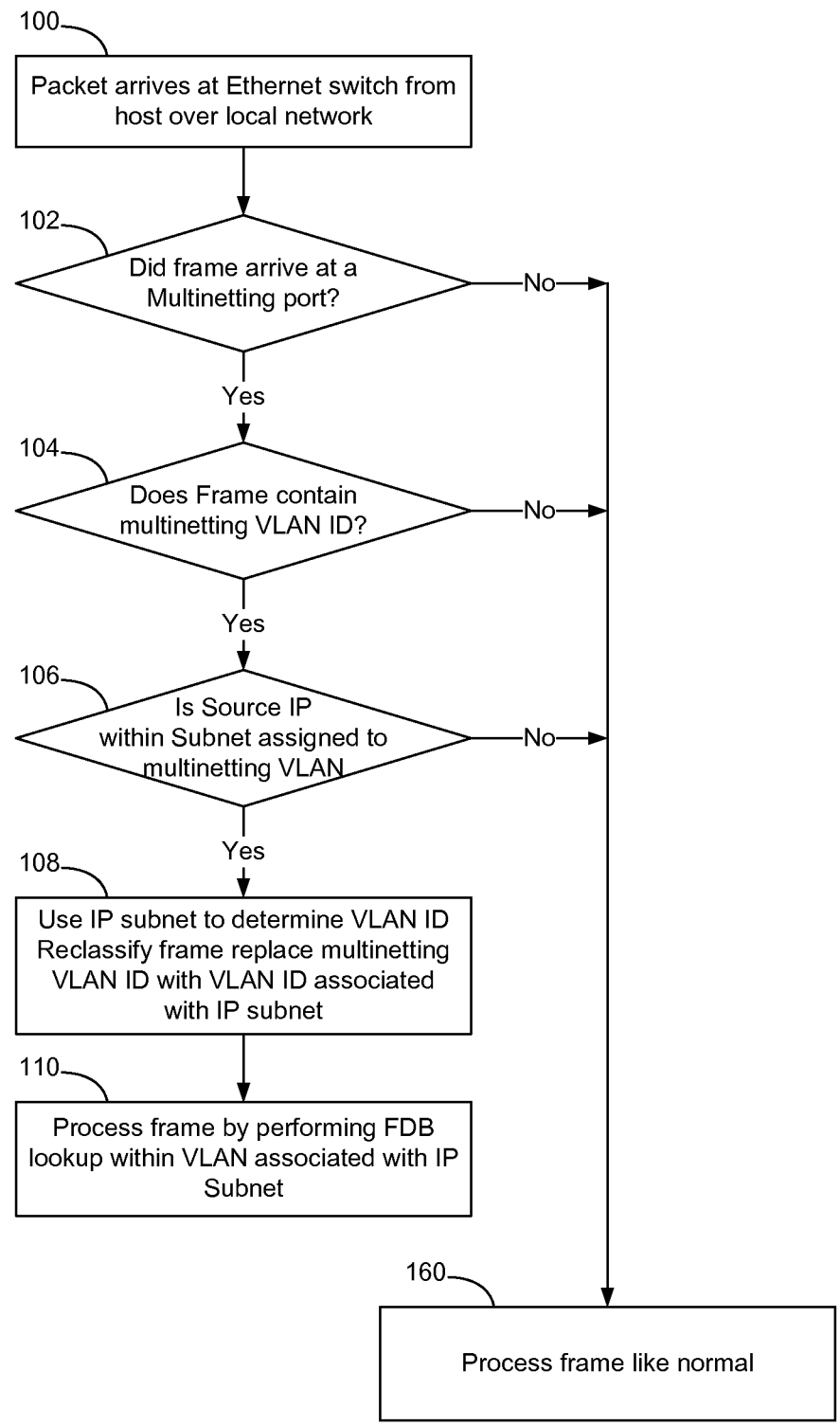
FIGS. 5 and 7 are flow chart of a process that may be implemented by the core switch of FIG. 3 to implement IP multinetting when handling the packets received from an IP multinetting VLAN.
Figure 6:
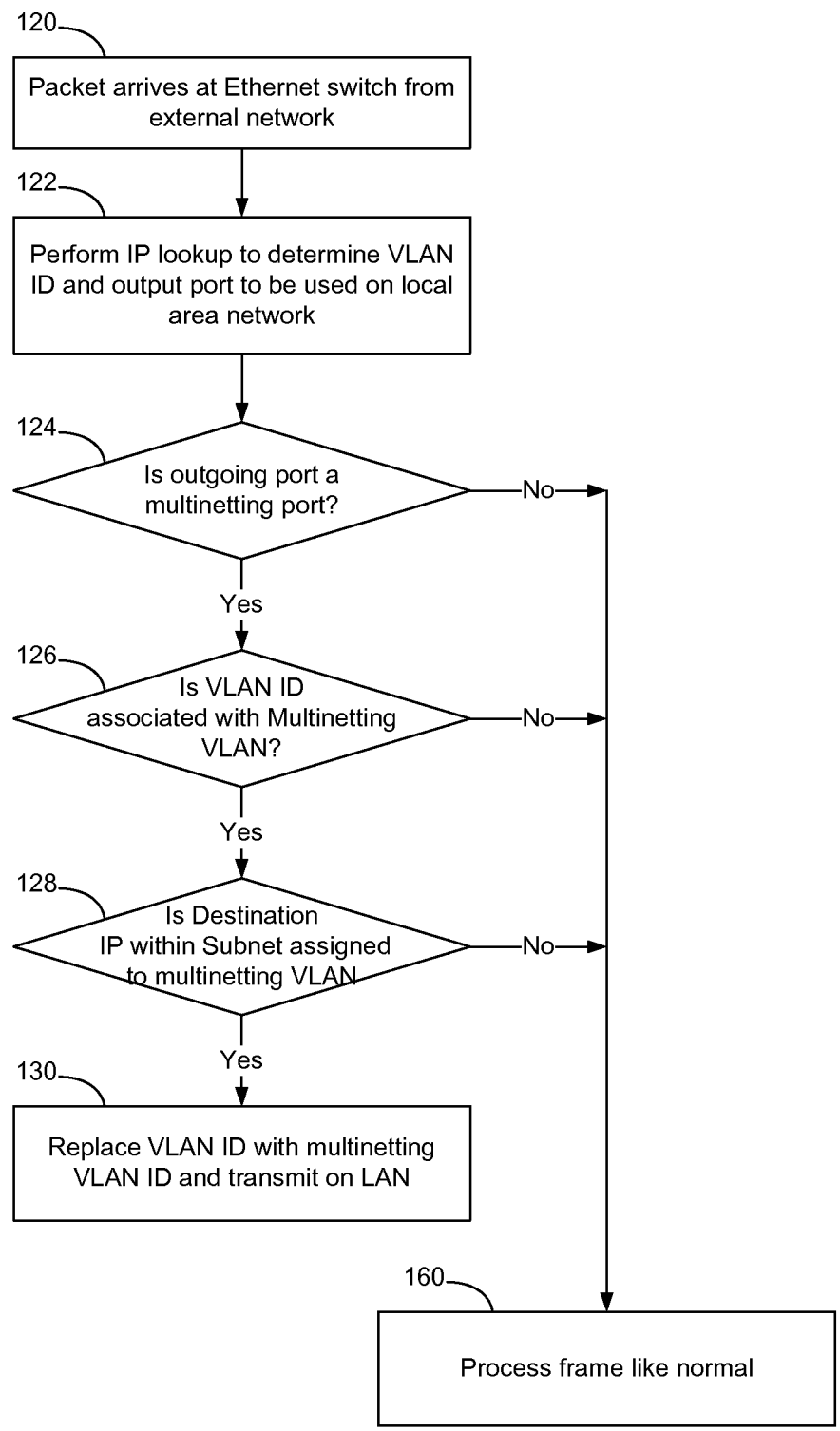
FIG. 6 is a flow chart of a process that may be implemented by the core switch of FIG. 3 to implement IP multinetting when handling the packets to be transmitted on the IP multinetting VLAN.
Figure 7:
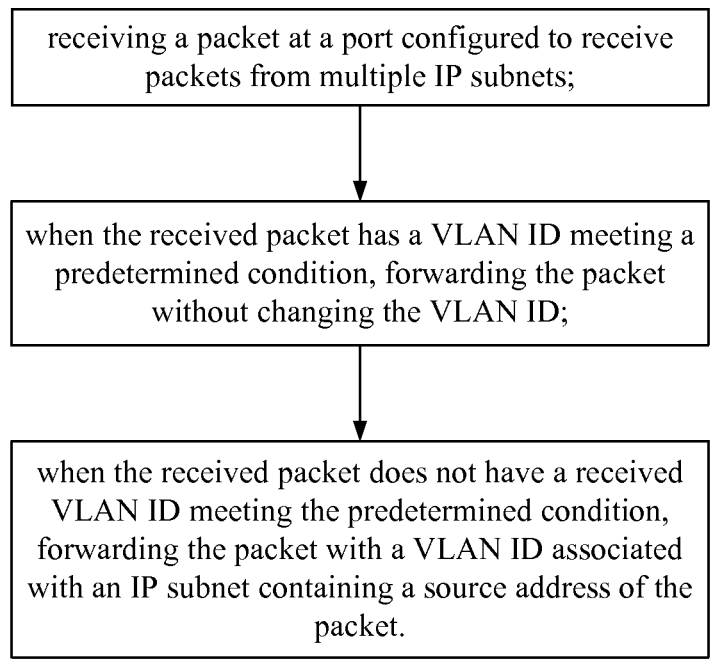

FIGS. 5 and 6 show the processes that the example core switch may use to process data to enable the core switch to support IP multinetting according to an embodiment of the invention. FIG. 5 shows the process implemented by the core switch when a packet is received from the local area network at port 70, and FIG. 6 shows the process implemented by the core switch when the packet is received from the external routed network.

To support IP multinetting, the port 70 will be defined as an IP multinetting port by a network administrator. Likewise, the administrator will need to define which VLANs are to be used to support IP multinetting. For example, in FIG. 3 it will be assumed that port 70 has been defined as a IP multinetting port and that VLAN:50 has been defined as an IP multinetting VLAN.

When a packet arrives at the core switch from a host over a local area network (100), the core switch will determine whether the packet arrived at an IP Multinetting port (102). If the port on which the packet was received has not been defined as an IP Multinetting port, the packet will be treated using normal processes (160).

If the port on which the packet was received was configured to support IP multinetting, the core switch will then look to determine whether the packet contains a VLAN ID that is an IP multinetting VLAN (104). If the packet does not contain the IP multinetting VLAN ID, IP Multinetting processing is not required on the packet and the packet can be processed as normal.

If the packet arrived on an IP multinetting port, and carries an IP Multinetting VLAN ID, the core switch will also determine whether the source IP address is associated with an IP subnet that has been assigned to the multinetting VLAN (106). If not, the packet may be processed like normal.

However, if all three of these conditions are true—the packet arrived at an IP Multinetting port, carried an IP Multinetting VLAN ID, and had a source IP address from an IP subnet associated with the multinetting VLAN, then the packet is to be processed as an IP multinetting packet prior to being handled by the core switch.

Specifically, the ingress port 70 will use the IP subnet address to determine, from VLAN tables 76, a new VLAN to be used for the packet. The ingress port will thus re-classify the packet from the IP multinetting VLAN to a VLAN where the IP subnet is unique, and will replace the IP multinetting VLAN ID with the unique VLAN ID (108) associated with the IP subnet. The ingress port will then pass the modified packet internally within the core device for processing. For example, the core network element may process the packet by performing a forwarding database lookup within the VLAN associated with the IP subnet (110). Other processing operations that rely on a one-to-one correspondence between IP subnet and VLAN may then be performed by the core network element as well, since the ingress port performed VLAN reclassification so that the IP address associated with the packet is unique within the reclassified VLAN.

FIG. 4 shows an example in which two hosts each transmit a packet on VLAN 50 toward core switch 20. Specifically, a first host transmits a packet within VLAN 50 and having a host IP address of 192.168.11.2. Thus, this first host is in a first IP subnet 192.168.11.0/24. Likewise, a second host transits a packet within VLAN 50 and which has a host IP address of 192.168.12.2. Accordingly, the second host is in a second IP subnet 192.168.12.0/24.

When the packets are received at LAN port 70, the core switch will determine that port 70 is an IP multinetting port. Accordingly, the core switch will also determine whether the packets were transmitted within the IP multinetting VLAN. To do this, a lookup may be performed in VLAN tables 76 to determine whether the VLAN ID matches an IP Multinetting VLAN ID for this port. Additionally, the IP address will be used to determine whether the packet is associated with an IP subnet that is part of the IP multinetting VLAN. If so, the value of the actual VLAN associated with the IP subnet will be determined. The port 70 will then replace the IP multinetting VLAN ID with the VLAN ID corresponding to the IP subnet. Thus, for example, in FIG. 4, IP subnet 192.168.11.0/24 corresponds to VLAN:20. Accordingly, the ingress port 70 will replace multinetting VLAN:50 with VLAN:20 and pass the packet on within the core switch for further processing. Likewise, subnet 192.168.12.0/24 corresponds to VLAN:30. Accordingly, the ingress port 70 will replace multinetting VLAN:50 with one-to-one corresponding VLAN:30 before passing the packet to the core switch for further processing.

By providing VLAN translation at the LAN port, one VLAN ID may be used for hosts on the LAN regardless of IP subnet address of the hosts. Thus, hosts from multiple IP subnets may be connected to the same VLAN so that, from a network perspective, the core switch appears to support IP Multinetting. However, since traffic is reclassified when it is received from the LAN before being processed by the network element, the architecture of the core switch is not required to be modified to support IP Multinetting. This allows the core switch to process traffic under the assumption that there is at most one IP subnet associated with a particular VLAN ID.

FIG. 6 shows a process implemented by the core switch upon receipt of a packet from the external routed network. When a packet arrives at the Ethernet switch from the external network (120) the core switch will perform an IP lookup to determine the output port and VLAN ID to be used to transport the packet on the attached local area network (122). At this point, the VLAN ID corresponds on a one-to-one basis with a particular IP Subnet. Note, as used herein, the phrase "corresponds on a one-to-one basis" means that addresses from at most one IP subnet are assigned to a particular VLAN. The converse is not true—IP addresses from the same subnet may be assigned to multiple VLANs, as long as each of those VLANs only includes IP addresses from that particular IP subnet.

When the packet arrives at the outgoing LAN port, the outgoing LAN port will determine whether it is a multinetting port (124). If the outgoing port is a multinetting port, the VLAN ID assigned to the packet will be read to determine whether the VLAN ID is associated with the IP multinetting VLAN (126). If the VLAN ID is one of the VLAN IDs associated with the IP multinetting VLAN, then the destination IP address will be checked to see if the destination IP address is within a subnet assigned to the multinetting VLAN (128). If all of these checks return positive, then the packet VLAN ID will be replaced with the multinetting VLAN ID before transmitting the packet on the local area network (130). If any of the checks return as false, then the packet is to be transmitted without VID translation and the packet will be processed as a normal packet (160).

In connection with FIGS. 5 and 6, a series of checks was performed to determine whether a received packet from the local area network was transmitted on the IP multinetting VLAN and whether a packet received from an external network is to be transmitted on the IP multinetting VLAN. These checks may be performed in the order presented, may be performed in a different order, or may be performed in parallel. For example, the input port 70 may be configured in hardware to check for particular VLAN IDs at the same time that it looks for particular IP subnet values. Thus, the invention is not limited to a particular order in which these processes are performed or to a particular way in which the particular processes are performed.

By performing a series of checks, an IP Multinetting port connected to a VLAN may selectively perform VLAN ID translation only on traffic associated with the IP multinetting VLAN. This enables the LAN port to simulate IP multinetting as necessary while also transmitting other traffic on VLANs that are not required to be IP multinetting VLANs.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of processing a packet at a network element, the method comprising:
    receiving the packet at a port configured to receive packets from multiple IP subnets;
    when the received packet has a VLAN ID meeting a predetermined condition, forwarding the packet without changing the VLAN ID; and
    when the received packet does not have a received VLAN ID meeting the predetermined condition, forwarding the packet with a VLAN ID associated with an IP subnet containing a source address of the packet.

2. The method of claim 1, wherein the predetermined condition is that the VLAN ID of the received packet is not associated with a multinetting VLAN.

3. The method of claim 2, wherein when the received packet does have a VLAN ID associated with a multinetting VLAN, the VLAN ID of the received packet is replaced with a different VLAN ID associated with the IP subnet containing the source address of the packet, and the packet is forwarded with the different VLAN ID.

4. The method of claim 2, wherein when the received packet does have a VLAN ID associated with a multinetting VLAN, the packet is forwarded with a different VLAN ID determined by the IP subnet containing the source address of the packet.

5. The method of claim 1, wherein when the received packet does not have a VLAN ID meeting the predetermined condition, the packet is forwarded with a VLAN ID determined by the IP subnet containing the source address of the packet.

6. A network element for processing packets, the network element comprising:
    a port configured to receive packets from multiple IP subnets;
    a processor configured:
        when a received packet has a VLAN ID meeting a predetermined condition, to forward the packet without changing the VLAN ID; and
        when a received packet does not have a VLAN ID meeting the predetermined condition, to forward the packet with a VLAN ID associated with an IP subnet containing a source address of the packet.

7. The network element of claim 6, wherein the predetermined condition is that the VLAN ID of the received packet is not associated with a multinetting VLAN.

8. The network element of claim 7, wherein the processor is configured, when the received packet does have a VLAN ID associated with a multinetting VLAN, to replace the received VLAN ID with a different VLAN ID associated with the IP subnet containing the source address of the packet, and to forward the packet with the different VLAN ID.

9. The network element of claim 7, wherein the processor is configured, when the received packet does have a VLAN ID associated with a multinetting VLAN, to forward the packet with a different VLAN ID determined by the IP subnet containing the source address of the packet.

10. The network element of claim 6, wherein the processor is configured, when the received packet does not have a VLAN ID meeting the predetermined condition, to forward the packet with a VLAN ID determined by the IP subnet containing the source address of the packet.

* * * * *